United States Patent
Charbit et al.

(10) Patent No.: US 9,198,000 B2
(45) Date of Patent: Nov. 24, 2015

(54) METHOD AND APPARATUS FOR A CELLULAR ASSISTED INTELLIGENT TRANSPORTATION SYSTEM

(71) Applicant: Broadcom Corporation, Irvine, CA (US)

(72) Inventors: Gilles Charbit, Farnborough (GB); Matti Kullervo Jokimies, Salo (FI)

(73) Assignee: BROADCOM CORPORATION, Irvine, CA (US)

( * ) Notice: Subject to any disclaimer, the term of this patent is extended or adjusted under 35 U.S.C. 154(b) by 35 days.

(21) Appl. No.: 14/084,085

(22) Filed: Nov. 19, 2013

(65) Prior Publication Data

US 2014/0073326 A1 Mar. 13, 2014

Related U.S. Application Data

(62) Division of application No. 13/246,462, filed on Sep. 27, 2011, now Pat. No. 8,892,028.

(51) Int. Cl.
*H04B 3/36* (2006.01)
*H04W 4/02* (2009.01)
*H04W 68/00* (2009.01)

(52) U.S. Cl.
CPC .............. *H04W 4/026* (2013.01); *H04W 68/00* (2013.01)

(58) Field of Classification Search
CPC ............................. H04W 4/026; H04W 68/00
See application file for complete search history.

(56) References Cited

U.S. PATENT DOCUMENTS

| | | | | |
|---|---|---|---|---|
| 6,304,759 | B1* | 10/2001 | Jiang et al. | 455/502 |
| 6,714,785 | B1* | 3/2004 | Han | 455/440 |
| 6,829,531 | B2* | 12/2004 | Lee | 701/537 |
| 2003/0157937 | A1* | 8/2003 | Oikarinen et al. | 455/445 |
| 2007/0274221 | A1 | 11/2007 | Lee et al. | |
| 2008/0159234 | A1 | 7/2008 | Prakash et al. | |
| 2010/0081391 | A1 | 4/2010 | Suzuki et al. | |
| 2010/0234071 | A1 | 9/2010 | Shabtay et al. | |

(Continued)

FOREIGN PATENT DOCUMENTS

DE 10 2008 037 883 A1 4/2009
DE 10 2009 054 795 A1 9/2010

(Continued)

OTHER PUBLICATIONS

Combined Search and Examination Report for Application No. GB920110138GB1 dated Jan. 23, 2012.
Fernandes, P. et al., *Platooning of Autonomous Vehicles With Intervehicle Communications in SUMO Traffic Simulator*, 2010 13th International IEEE, Annual Conference on Intelligent Transportation Systems, Madeira Island, Portugal, Sep. 2010, 1313-1318.

(Continued)

*Primary Examiner* — Ronald Eisner
(74) *Attorney, Agent, or Firm* — Oblon, McClelland, Maier & Neustadt, L.L.P.

(57) ABSTRACT

A method, apparatus and computer program product are therefore provided according to an example embodiment to provide a cellular based ITS environment. The cellular based ITS environment may be configured based on LTE based interfaces. In this regard, a method includes receiving configuration information from a first access point, wherein the configuration information defines an ITS target area comprising at least the first access point and a first RSU. A method also includes receiving an ITS paging message from the first access point. A method also includes causing a reselection of the first RSU while in the communications range of the first access point in the ITS target area and in response to the received ITS paging message.

19 Claims, 7 Drawing Sheets

(56) References Cited

U.S. PATENT DOCUMENTS

| | | | |
|---|---|---|---|
| 2010/0311322 A1* | 12/2010 | Bao et al. .................... | 455/9 |
| 2011/0075604 A1 | 3/2011 | Fong et al. | |
| 2011/0187560 A1 | 8/2011 | Stahlin | |
| 2011/0298636 A1 | 12/2011 | Sekiguchi | |
| 2012/0113887 A1* | 5/2012 | Shen et al. .................... | 370/315 |

FOREIGN PATENT DOCUMENTS

| | | | |
|---|---|---|---|
| DE | 2010 029 418 A1 | | 12/2010 |
| GB | 2370449 A | * | 6/2002 |
| JP | 2009-151671 A | | 7/2009 |
| NL | 1007930 C1 | | 2/1998 |
| WO | WO 2009/081818 A1 | | 7/2009 |
| WO | WO 2010/130612 A1 | | 11/2010 |
| WO | WO 2011/000193 A1 | | 1/2011 |
| WO | WO 2011000193 A8 | * | 4/2011 |

OTHER PUBLICATIONS

Uzcategui, R. A. et al., *WAVE: A Tutorial*, Topics in Automotive Networking, IEEE Communications Magazine, May 2009, 126-133.

Zheng, K. et al., *Multihop Cellular Networks Toward LTE-Advanced, Its Architecture and Performance*, IEEE Vehicular Technology Magazine, Sep. 2009, 40-47.

Intelligent transport system [online] [retrieved Mar. 7, 2012]. Retrieved from the Internet: <URL: http://en.wikipedia.org/wiki/Intelligent_transportation-system>. 8 pages.

Relays for LTE, 3GPP™ Work Item Description, Release 10, RP-101417, Nov. 2009, 4 pages.

Relays for LTE—Core part, 3GPP™ Work Item Description, Release 10, RP-101417, Nov. 2009, 4 pages.

Relays for LTE—Performance part, 3GPP™ Work Item Description, Release 10, RP-101417, Nov. 2009, 4 pages.

Office Action for U.S. Appl. No. 13/246,462 dated Jan. 7, 2014.

* cited by examiner

METHOD AND APPARATUS FOR A CELLULAR ASSISTED INTELLIGENT TRANSPORTATION SYSTEM

CROSS-REFERENCE TO RELATED APPLICATIONS

This application is a divisional of U.S. application Ser. No. 13/246,462, filed Sep. 27, 2011, which is hereby incorporated herein in its entirety by reference.

TECHNOLOGICAL FIELD

Embodiments of the present invention relate generally to intelligent transportation system technology and, more particularly, to cellular based intelligent transportation systems.

BACKGROUND

Intelligent transportation systems (ITS) are configured to automate interactions between vehicles in order to achieve greater levels of safety, security and efficiency. For example, an ITS may enable a mobile terminal on an emergency vehicle to notify surrounding vehicles and/or upcoming traffic of its approach. Advantageously the notification may cause an alert and may even attempt to slow the nearby vehicles to allow for the safe passage of the emergency vehicle. Other embodiments of an ITS may include setting variable speed limits, reporting traffic flow and/or the like.

In order to provide wireless access in vehicular environments, a Wireless Access Vehicular Environment (WAVE) system architecture was developed. A WAVE system consists of fixed road side units (RSUs) usually positioned along roads and mobile terminals (e.g., on board units or OBUs) mounted in vehicles. The RSUs and mobile terminals may form WAVE basic service sets (WBSSs) connected to the Wide Area Network (WAN) via an appropriate portal. Such a portal may be implemented via cable linking the RSU and the WAN, but this may, for example, add significantly to cost of implementing an ITS system. Another version of a WAVE system may be implemented wirelessly over an ITS band. However, using the wireless band has proven, for example, to starve an ITS-Dedicated Short Range Communications (DSRC) system of frequency resources. The ITS-DSRC is customarily deployed over 75 MHz of bandwidth in a relatively high-frequency band around 5.9 GHz in 10-20 MHz channel bandwidth, and therefore may not be suited for potentially long transmission range due to path loss. Additionally, increasing transmission power of the RSU-WAN link to account for the transmission range may lead to significant interference issues for the RSU-mobile terminal link. Other current wireless solutions, such as those solutions used in current cellular networks are generally not suitable for an ITS environment due to the potential speed and high mobility of a mobile terminal as well as the generally small size of some RSU cells.

BRIEF SUMMARY

A method, apparatus and computer program product are therefore provided according to an example embodiment to provide a cellular based ITS environment. The cellular based ITS environment may be configured based on long term evolution (LTE) based interfaces. Such interfaces provide for a connection to a mobile terminal not only via an RSU, but also provide for a direct link between an access point and a mobile terminal. In one embodiment, the method, apparatus and computer program product provide an additional state for a mobile terminal, which is referred to as a ready state herein. The method, apparatus, and computer program product, may also enable a defined ITS target area and provide for an ITS paging mechanism.

In one embodiment, a method is provided that receiving configuration information from a first access point, wherein the configuration information defines an ITS target area comprising at least the first access point and a first RSU. A method also includes receiving an ITS paging message from the first access point. A method also includes causing a reselection of the first RSU while in the communications range of the first access point in the ITS target area and in response to the received ITS paging message.

In another embodiment, an apparatus is provided that includes at least one processor and at least one memory including computer program code with the at least one memory and the computer program code configured to, with the at least one processor, cause the apparatus at least to receive configuration information from a first access point, wherein the configuration information defines an ITS target area comprising at least the first access point and a first RSU. The at least one memory and the computer program code are also configured to, with the at least one processor, cause the apparatus at least to receive an ITS paging message from the first access point. The at least one memory and the computer program code are also configured to, with the at least one processor, cause a reselection of the first RSU while in the communications range of the first access point in the ITS target area and in response to the received ITS paging message.

In a further embodiment, a computer program product is provided that includes at least one non-transitory computer-readable storage medium having computer-readable program instructions stored therein, the computer-readable program instructions including program instructions that are configured to receive configuration information from a first access point, wherein the configuration information defines an ITS target area comprising at least the first access point and a first RSU. The computer-readable program instructions of this embodiment also include program instructions configured to cause the apparatus at least to receive an ITS paging message from the first access point. The computer-readable program instructions of this embodiment also include program instructions configured to cause a reselection of the first RSU while in the communications range of the first access point in the ITS target area and in response to the received ITS paging message.

In yet another embodiment, an apparatus is provided that includes means for receiving configuration information from a first access point, wherein the configuration information defines an ITS target area comprising at least the first access point and a first RSU. An apparatus also includes means for receiving an ITS paging message from the first access point. An apparatus also includes means for causing a reselection of the first RSU while in the communications range of the first access point in the ITS target area and in response to the received ITS paging message.

In one embodiment, a method is provided that includes determining a location and at least a movement direction of a mobile terminal. A method also includes determining at least one next RSU in an ITS target area based on the determined location and at least the movement direction of the mobile terminal. A method also includes causing configuration information to be transmitted to the mobile terminal, wherein the configuration information defines the ITS target area. A method also includes causing an ITS paging message to be transmitted to the mobile terminal from the determined next RSU.

In another embodiment, an apparatus is provided that includes at least one processor and at least one memory including computer program code with the at least one memory and the computer program code configured to, with the at least one processor, cause the apparatus at least to determine a location and at least a movement direction of a mobile terminal. The at least one memory and the computer program code are also configured to, with the at least one processor, cause the apparatus at least to determine at least one next RSU in an ITS target area based on the determined location and at least the movement direction of the mobile terminal. The at least one memory and the computer program code are also configured to, with the at least one processor, cause the apparatus at least to cause configuration information to be transmitted to the mobile terminal, wherein the configuration information defines the ITS target area. The at least one memory and the computer program code are also configured to, with the at least one processor, cause the apparatus at least to cause an ITS paging message to be transmitted to the mobile terminal from the determined next RSU.

In a further embodiment, a computer program product is provided that includes at least one non-transitory computer-readable storage medium having computer-readable program instructions stored therein, the computer-readable program instructions including program instructions are configured determine a location and at least a movement direction of a mobile terminal. The computer-readable program instructions of this embodiment also include program instructions configured to determine at least one next RSU in an ITS target area based on the determined location and at least the movement direction of the mobile terminal. The computer-readable program instructions of this embodiment also include program instructions configured to cause configuration information to be transmitted to the mobile terminal, wherein the configuration information defines the ITS target area. The computer-readable program instructions of this embodiment also include program instructions configured to cause an ITS paging message to be transmitted to the mobile terminal from the determined next RSU.

In yet another embodiment, an apparatus is provided that includes means for determining a location and at least a movement direction of a mobile terminal. An apparatus also includes means for determining at least one next RSU in an ITS target area based on the determined location and at least the movement direction of the mobile terminal. An apparatus also includes means for causing configuration information to be transmitted to the mobile terminal, wherein the configuration information defines the ITS target area. An apparatus also includes means for causing an ITS paging message to be transmitted to the mobile terminal from the determined next RSU.

In one embodiment, a method is provided that includes receiving a location and at least a movement direction of an approaching mobile terminal. A method also includes receiving configuration information for the approaching mobile terminal. A method also includes causing ITS paging message to be transmitted to the mobile terminal. A method also includes receiving an indication that the approaching mobile terminal has performed reselection.

In another embodiment, an apparatus is provided that includes at least one processor and at least one memory including computer program code with the at least one memory and the computer program code configured to, with the at least one processor, cause the apparatus at least to receive a location and at least a movement direction of an approaching mobile terminal. The at least one memory and the computer program code are also configured to, with the at least one processor, cause the apparatus at least to receive configuration information for the approaching mobile. The at least one memory and the computer program code are also configured to, with the at least one processor, cause the apparatus at least to cause an intelligent transportation system "ITS" paging message to be transmitted to the mobile terminal. The at least one memory and the computer program code are also configured to, with the at least one processor, cause the apparatus at least to receive an indication that the approaching mobile terminal has performed reselection.

In a further embodiment, a computer program product is provided that includes at least one non-transitory computer-readable storage medium having computer-readable program instructions stored therein, the computer-readable program instructions including program instructions that are configured to receive a location and at least a movement direction of an approaching mobile terminal. The computer-readable program instructions of this embodiment also include program instructions configured to receive configuration information for the approaching mobile. The computer-readable program instructions of this embodiment also include program instructions configured to cause an intelligent transportation system "ITS" paging message to be transmitted to the mobile terminal. The computer-readable program instructions of this embodiment also include program instructions configured to receive an indication that the approaching mobile terminal has performed reselection.

In yet another embodiment, an apparatus is provided that includes means receiving a location and at least a movement direction of an approaching mobile terminal. An apparatus also includes means for receiving configuration information for the approaching mobile terminal. An apparatus also includes means for causing ITS paging message to be transmitted to the mobile terminal. An apparatus also includes means for receiving an indication that the approaching mobile terminal has performed reselection.

BRIEF DESCRIPTION OF THE DRAWINGS

Figure 1:
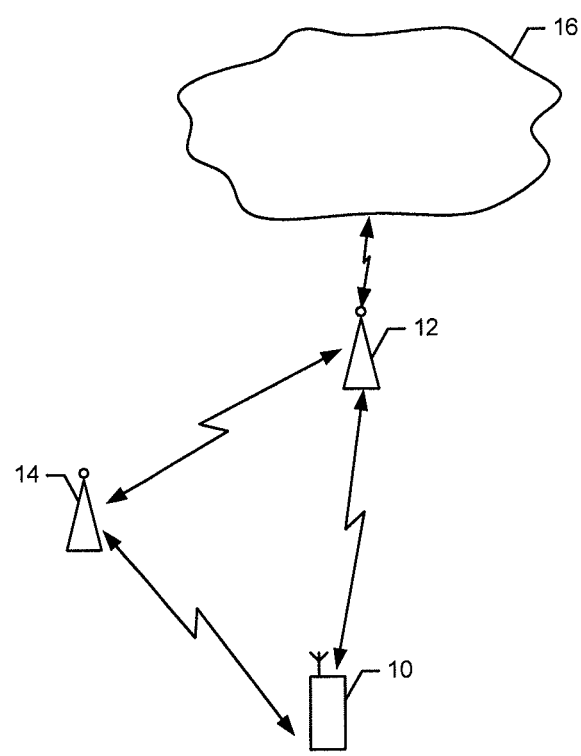
Figure 2:
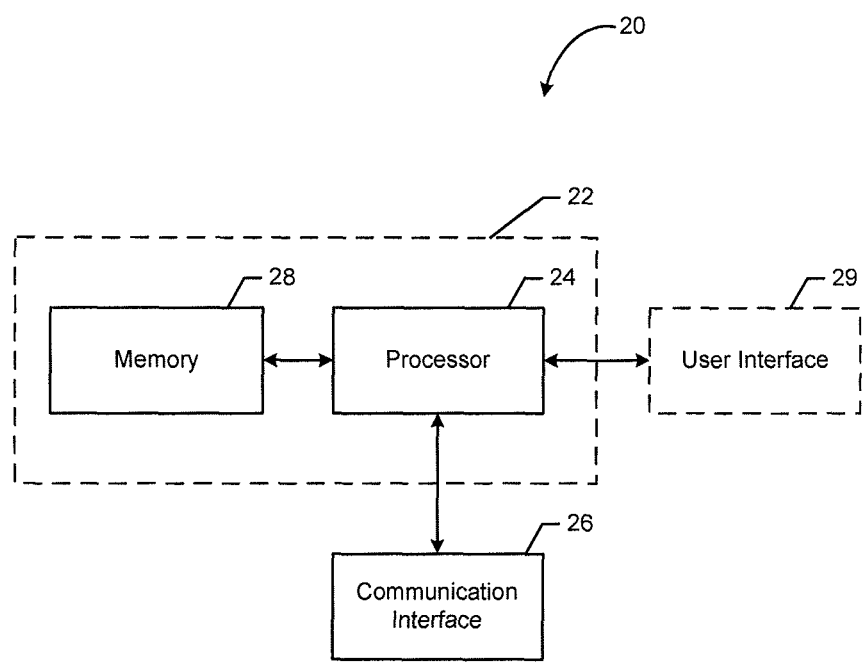
Figure 3:
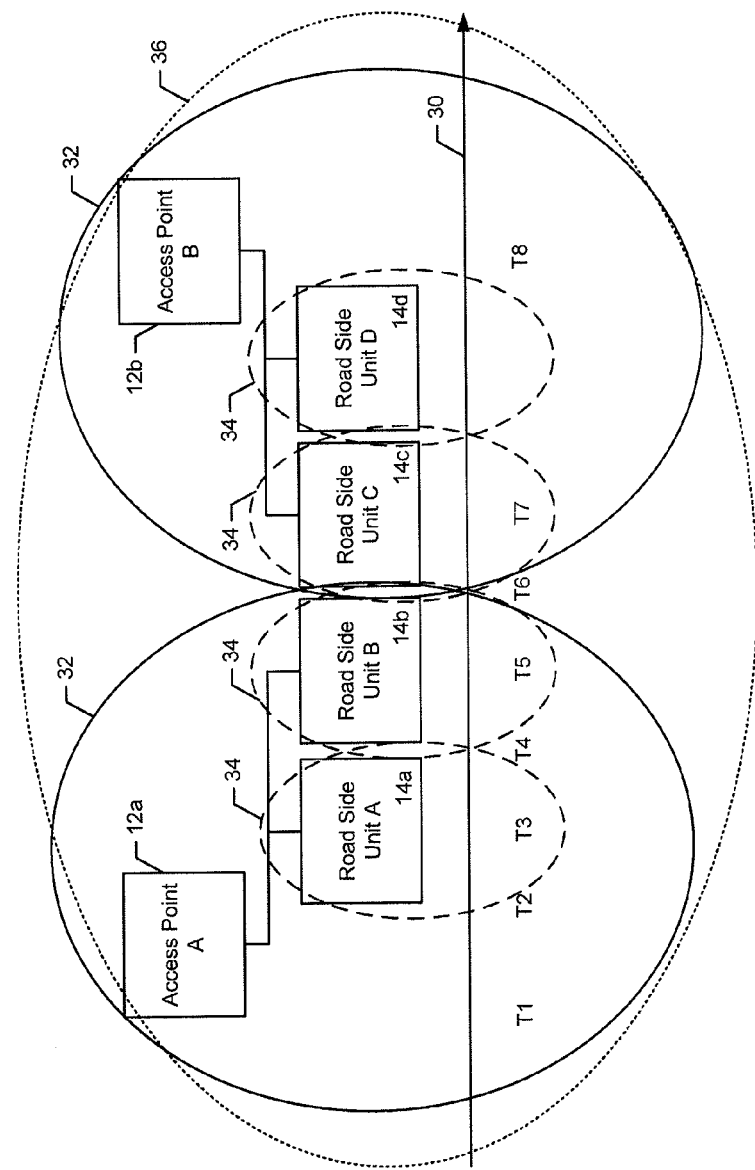
Figure 4:
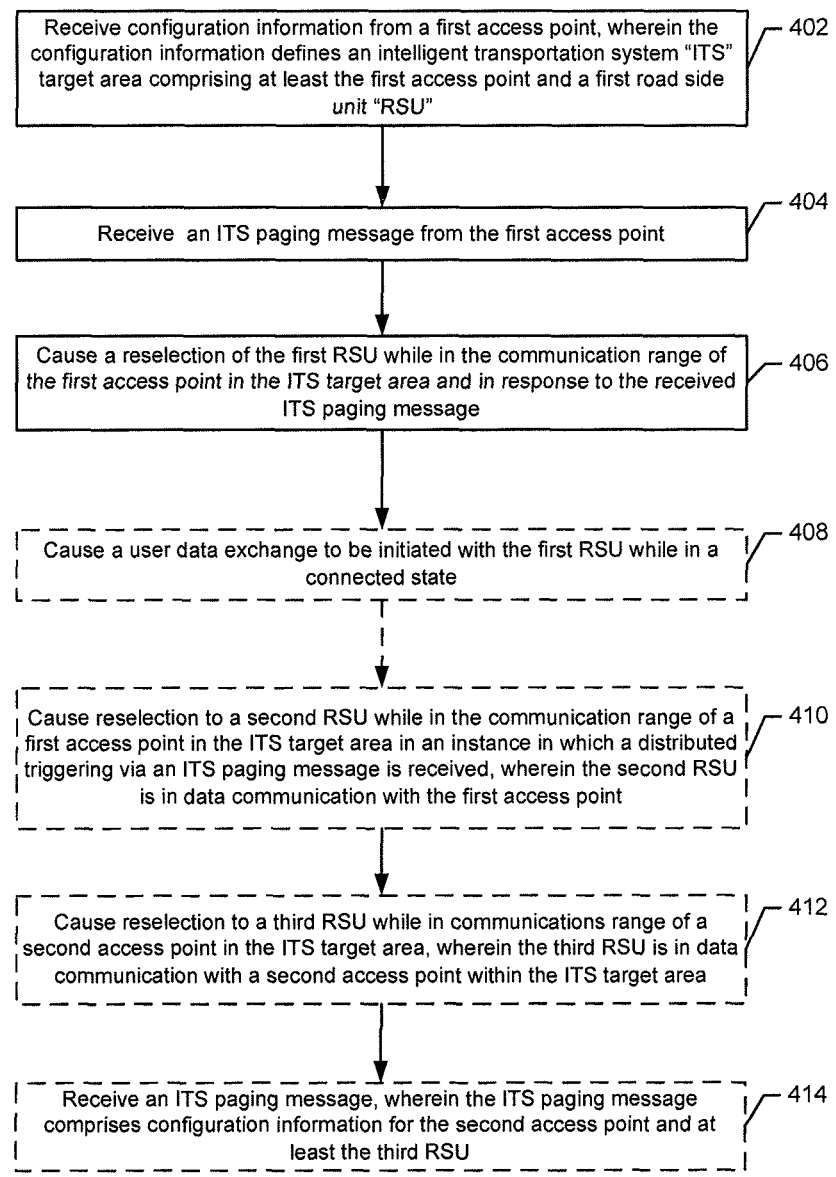
Figure 5:
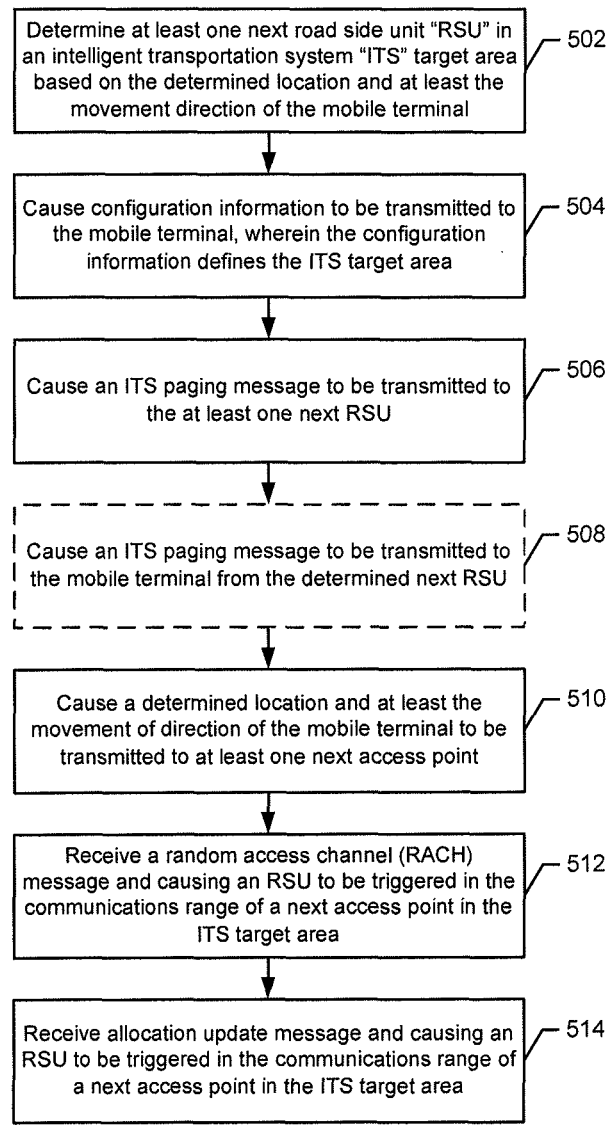
Figure 6:
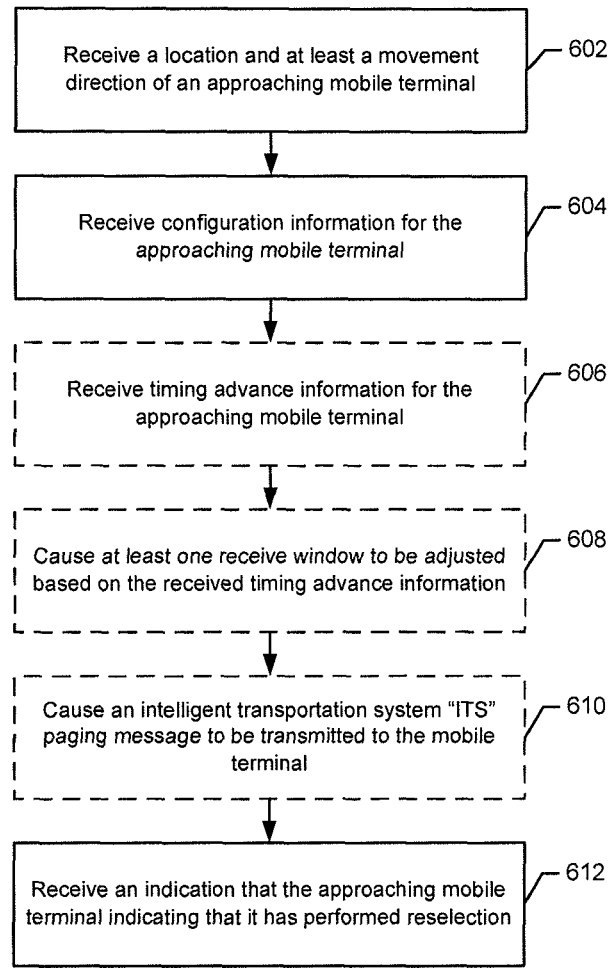
Figure 7:
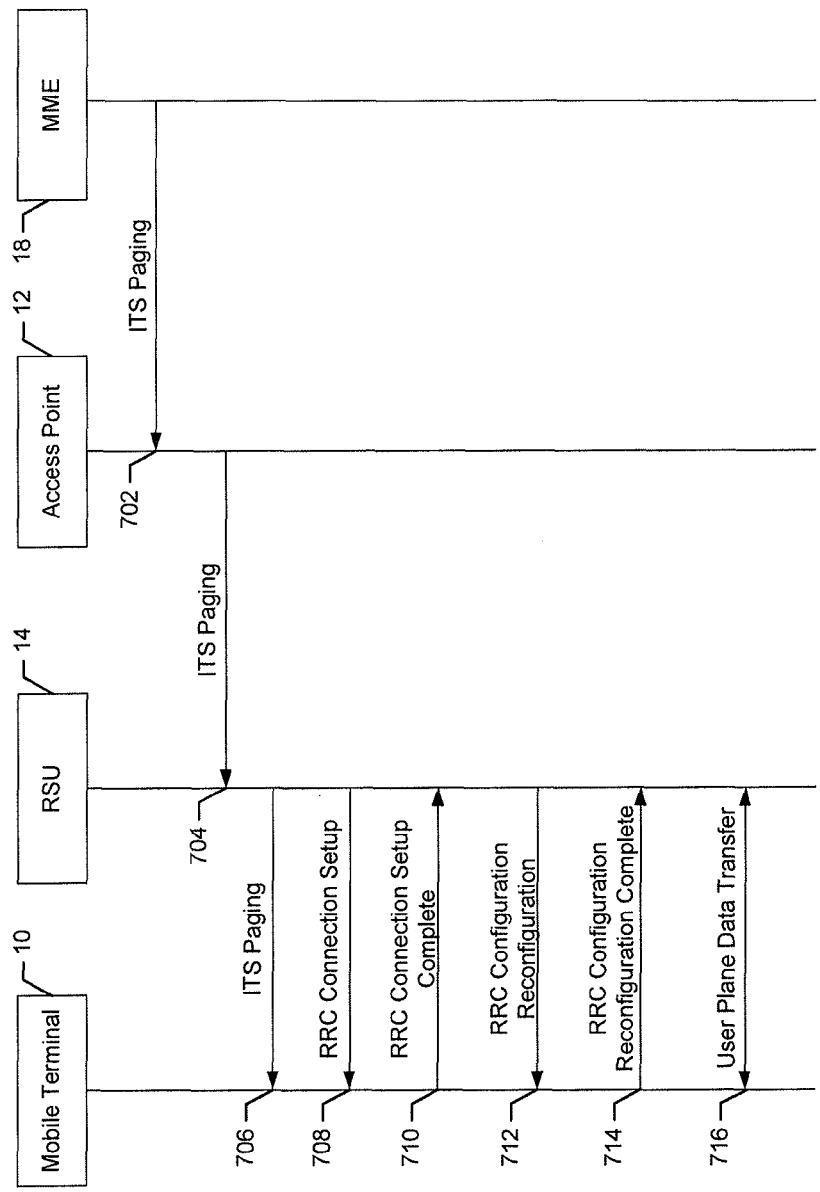

Having thus described the example embodiments of the invention in general terms, reference will now be made to the accompanying drawings, which are not necessarily drawn to scale, and wherein:

FIG. 1 is a schematic representation of an example ITS that may benefit from an embodiment of the present invention;

FIG. 2 is a block diagram of an example apparatus that may be embodied by an example mobile terminal in accordance with one embodiment of the present invention;

FIG. 3 is a system overview diagram illustrating an example ITS operating according to an embodiment of the present invention;

FIG. 4 is a flow chart illustrating operations performed by an example mobile terminal in accordance with one embodiment of the present invention;

FIG. 5 is a flow chart illustrating operations performed by an example access point in accordance with one embodiment of the present invention;

FIG. 6 is a flow chart illustrating operations performed by an example RSU in accordance with one embodiment of the present invention; and FIG. 7 is a signaling flow diagram illustrating an example ITS paging procedure for a mobile terminal terminated service in accordance with one embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

A method, apparatus and computer program product of an example embodiment of the present invention are configured to provide an ITS system based on cellular communications. Advantageously such a system, for example, allows for the implementation of a wireless system with a reduction in the path loss and interference concerns as discussed above. The cellular ITS system, further may be implemented using LTE interfaces that enable various connections between mobile terminals, RSUs and access points. For example, an interface between a mobile terminal and an RSU, may be based on an LTE mobile terminal to relay node air interface used on cellular bands, which may be referred to as an access link. An example interface between the RSU and the access point may be based on an LTE relay node to access point interface used on cellular bands and referred to as the back haul link. Additionally, a direct connection between a mobile terminal and an access point may also be implemented based on an LTE mobile terminal to access point interface.

In an embodiment, the example ITS further includes a mobile terminal that is configured to enter a ready state, such as an LTE RRC-READY state. As described herein, the ready state enables the mobile terminal to listen for an ITS paging message from an RSU and to perform implicit handovers between RSUs as the mobile terminal is traveling within the ITS. Such a state, advantageously, for example, provides for faster movement between RSUs and at least partially accounts for the high mobility of a mobile terminal in an ITS system.

Further, the example ITS system may also include an ITS target area that is defined by the communications range of an access point. An ITS target area is generally defined by a plurality of RSUs that are in the communications range of an access point. An ITS target area advantageously, for example allows for a security context to be maintained among RSU within an ITS target area, which further supports the high mobility of a mobile terminal.

A method, apparatus and computer program product of an example embodiment of the present invention also includes the use of ITS paging messages. Such messages provide configuration information that includes, but is not limited to paging parameters, timing advance parameters, ITS message type or predefined resource configuration.

Although the method, apparatus and computer program product may be implemented in a variety of different systems, one example of such a system is shown in FIG. 1, which includes a first communication device (e.g., mobile terminal 10) that is capable of communication via a access point 12, such as a base station, a macro cell, a Node B, an evolved Node B (eNB) or other access point or via an RSU 14 with a network 16 (e.g., a core network). While the network may be configured in accordance with LTE or LTE-Advanced (LTE-A), other networks may support the method, apparatus and computer program product of embodiments of the present invention including those configured in accordance with wideband code division multiple access (W-CDMA), CDMA2000, global system for mobile communications (GSM), general packet radio service (GPRS) and/or the like.

In an embodiment, an RSU 14 may be embodied as a transparent relay, without, for example, a cell ID, the RSU 14 may be configured to perform an initial cell access as a special mobile terminal to a macro-cell access point within coverage area. For example and as is discussed in LTE release-10, a specified Type 1 non-transparent relay, such as the RSU 14, may achieve downlink synchronization and perform initial cell access procedure over the air as a special mobile terminal. The cell access procedure may also include uplink timing alignment, RRC connection configuration and/or security activation. In an embodiment and at the end of an initial cell access procedure the RSU 14 may operate in a connected state, such as an RRC_CONNECTED state.

The network 16 may include a collection of various different nodes, devices or functions that may be in communication with each other via corresponding wired and/or wireless interfaces. For example, the network may include one or more cells, including access point 12 and which may serve a respective coverage area. The access point could 12 be, for example, part of one or more cellular or mobile networks or public land mobile networks (PLMNs). In turn, other devices such as processing devices (e.g., personal computers, server computers or the like) may be coupled to the mobile terminal 10 and/or other communication devices via the network.

A communication device, such as the mobile terminal 10 (also known as user equipment (UE) and/or an onboard unit (OBU)), may be in communication with other communication devices or other devices via the access point 12, the RSU 14 and, in turn, the network 16. In some cases, the communication device may include an antenna for transmitting signals to and for receiving signals from an access point 12 and/or the RSU 14.

In some example embodiments, the mobile terminal 10 may be a mobile communication device such as, for example, a vehicle-mounted transceiver unit, a mobile telephone, portable digital assistant (PDA), pager, laptop computer, or any of numerous other hand held or portable communication devices, computation devices, content generation devices, content consumption devices, or combinations thereof. As such, the mobile terminal 10 may include one or more processors that may define processing circuitry either alone or in combination with one or more memories. The processing circuitry may utilize instructions stored in the memory to cause the mobile terminal 10 to operate in a particular way or execute specific functionality when the instructions are executed by the one or more processors. The mobile terminal 10 may also include communication circuitry and corresponding hardware/software to enable communication with other devices and/or the network 16.

In one embodiment, for example, the mobile terminal 10, the access point 12 and/or the RSU 14 may be embodied as or otherwise include an apparatus 20 as generically represented by the block diagram of FIG. 2. While the apparatus 20 may be employed, for example, by a mobile terminal 10, an access point 12 or an RSU 14, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with processing circuitry 22 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 28 that may be in communication with or otherwise control a communication interface 26 and, in some cases, a user interface 29. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal 10, the processing circuitry may be embodied as a portion of a mobile computing device or other mobile terminal.

The user interface 29 (if implemented) may be in communication with the processing circuitry 22 to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms. The apparatus 20 need not always include a user interface. For example, in instances in which the apparatus is embodied as an access point 12 and/or an RSU 14, the apparatus may not include a user interface. As such, the user interface is shown in dashed lines in FIG. 2.

The communication interface 26 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network 16 and/or any other device or module in communication with the processing circuitry 22, such as between the mobile terminal 10, the access point 12 and the RSU 14. In this regard, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 28 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 28 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

A method, apparatus and computer program product of an example embodiment of the present invention is configured to provide an ITS system over a cellular network. The ITS system as described herein is configured to enable mobile terminals, such as mobile terminal 10, to perform initial macro-cell access and an establish a radio resource control (RRC) connection to an access point 12. In an embodiment, non-access stratum (NAS)-level security and a mobile terminal's capabilities may be stored in a mobility management entity (MME). An access stratum (AS) level security may be stored in an access point, such as in a memory 28 of access point 12. Once a mobile terminal has established an RRC connection and AS level security is stored, the data bearers may be removed and the mobile terminal may transition from a connected state to a ready state. For example, from an RRC_CONNECTED state to a RRC_READY state. Advantageously, for example the AS security context is maintained as long as the mobile terminal 10 is within an ITS target area under the same access point.

In an embodiment, a mobile terminal 10, while in a ready state, is configured to listen for ITS paging messages from an RSU 14. The ITS paging messages may provide information for the mobile terminal 10 relating to terminated data bearer establishment. The mobile terminal 10 while in the ready state, may then use the RACH for mobile terminal initiated data bearer establishment and/or location update to allow the network and/or an access point to trigger one or more RSUs 14 in a next ITS target area.

In an embodiment, and in an instance in which the mobile terminal is in a ready state, a change of RSU by the mobile terminal is triggered by ITS paging message 10 from the RSU 14 when data bearer is established. Because the RSU 14 is generally a transparent relay for the mobile terminal 10, while in a ready state, the mobile terminal 10 may perform reselection to another RSU 14 without signaling with the access point 12 and/or the network 14. In other words, an RSU 14 cell change is an implicit cell reselection. In implicit cell reselection, a handover command may not be necessary, and for example may only act to slow down the change of the cell and may also result in require frequent signaling.

In an embodiment, a mobile terminal 10, while in a ready state, such as a RRC_READY state, may perform an uplink timing alignment procedure to update a TA parameter. A TA update, for example, may allow an access point 12 to forward an updated TA parameter of a mobile terminal 10 to an RSU 14 in an ITS paging message. The access point 12 may also configure parameters for the uplink TA procedures of a mobile terminal 10 to ensure that a correct TA is known by a mobile terminal 10 in an instance in which the mobile terminal 10 is approaching and/or enters an ITS Target Area. Further, an RSU 14 may also determine an access point-mobile terminal RRC Connection establishment and initial security activation based on an ITS paging message, the RSU may also detect mobile terminal RACH preamble in RRC configured RACH resources. Thus, dedicated RRC signaling to setup the DRB may then proceed.

Alternatively or additionally measurement report messages may be optional as handover cell change decisions are not necessarily handled by the network in some embodiments. Thus, signaling between the mobile terminal 10 and the RSU 14 may be necessary in instances in which there is a user plane data transfer. See for example FIG. 7.

FIG. 3 is an overview diagram illustrating an example ITS according to an embodiment of the present invention. A mobile terminal, such as mobile terminal 10, may be traveling along the arrow 30 within an ITS system as shown. The mobile terminal at various times T1, T2 . . . T8 may experience different behaviors and may operate in different states. In the example ITS system of FIG. 3, there may be two access points 12a and 12b, with each access point, in this example, connected to two RSUs. Any number of access points and RSUs may be used in the example ITS systems as described herein.

In an embodiment, an ITS target area 36 is defined by the combined communication range of the access points 12a and 12b, where each access point 12a-12b has a defined range which is shown with reference to solid line 32. In alternate embodiments, an ITS target area may be defined by the communications range of a single access point, or may be defined by the communications range of a plurality of access points.

Each RSU 14a-14d also has a defined range which is shown with reference to dashed lines 34.

In an embodiment and at time T1, the mobile terminal 10 may be switched on by access point 12a. The mobile terminal then may also enter a connected mode (e.g. RRC_CONNECTED) to receive at least part of the configuration information for the ITS target area 36, which includes in this example RSU A 14a and B 14b and access point A 12a, as well as access point RSU C 14c and D 14d and access point A 12b. After the configuration information is received, the mobile terminal 10 may transition to a ready state (e.g. RRC_READY). The ready state is entered into in this instance because the mobile terminal 10 has entered an access point area A 12 A in the ITS target area that includes RSU A 14a and B 14b and has received the necessary configuration for each of the RSUs 14a and 14b.

In an embodiment and at time T2, the mobile terminal, such as mobile terminal 10, may enter the communications range of RSU A 14a and thus the mobile terminal 10 may perform reselection to RSU A 14a following distributed triggering via an ITS paging message from RSU 11. At time T3, the mobile terminal may initiate a user data exchange with RSU A 14a and based on the data exchange may enter a connected mode. After the data exchange the mobile terminal is configured to enter a ready state instead of an idle state (e.g. RRC_IDLE) because the mobile terminal is still in an ITS target area.

In an embodiment and at time T4, a mobile terminal 10 may be configured to perform reselection to RSU B 14b following distributed triggering via ITS paging by RSU B 14b. At block T5, the access point A 12 A may be configured to initiate a user data exchange, and may then send an ITS paging message to the mobile terminal 10 over RSU B 14b. In this instance the network and/or the access point A 14 A may have determined that the mobile terminal 10 is traveling down a particular road, such as the movement defined with reference to arrow 30, and therefore may be configured to predict future movements of the mobile terminal 10.

In an embodiment and at time T6, the mobile terminal 10, may be configured to perform reselection to RSU C 14 C. As is shown in FIG. 3, RSU C 14 C is in a different access point area B 12 B in an ITS target area from RSU B 14 B. Therefore, because of the transition from access point A 12 A to access point B 12 B, the mobile terminal 10 may receive the security context information or configuration information for access point B 12 B and related RSUs 14 C and 14 D and then enter an idle state after reselection of access point B 14 B in an instance in which the mobile terminal 10 is not yet within a communications range of RSU C 14 C.

In an embodiment and at time T7, access point B 14b and/or the network may initiate a user data exchange and may cause an ITS paging message to be transmitted to a mobile terminal, such as the mobile terminal 10. In some embodiments, the ITS paging message may be sent throughout the ITS target area. Upon receipt of the message, the mobile terminal 10 may enter a connected state to receive configuration information for RSU C 14c and D 14d. After the data exchange the mobile terminal may enter a ready state. At time T8, the mobile terminal may enter an idle state when leaving the communication range of RSU 14 D.

FIGS. 4-6 illustrate example operations performed by a method, apparatus and computer program product, such as apparatus 20 of FIG. 2 in accordance with one embodiment of the present invention are illustrated. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device 28 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 3 and 4, when executed, convert a computer or processing circuitry into a particular machine configured to perform an example embodiment of the present invention. Accordingly, the operations of FIGS. 4-6 define an algorithm for configuring a computer or processing circuitry 22, e.g., processor, to perform an example embodiment. In some cases, a general purpose computer may be provided with an instance of the processor which performs the algorithm of FIGS. 4-6 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified as described below. Moreover, in some embodiments additional optional operations may also be included (some examples of which are shown in dashed lines in FIG. 4). It should be appreciated that each of the modifications, optional additions or amplifications below may be included with the operations above either alone or in combination with any others among the features described herein.

FIG. 4 is a flow chart illustrating operations performed by an example mobile terminal as the mobile terminal moves through one or more ITS target areas in accordance with one embodiment of the present invention. As shown in operation 402, the apparatus 20 embodied, for example, by a mobile terminal 10, may include means, such as the processing circuitry 22, the processor 24, the communications interface 26 or the like, for receiving configuration information from a first access point, wherein the configuration information defines an ITS target area comprising at least a first access point and a first RSU. As is described with reference to FIG. 3, the ITS target area 36 is defined by a combined communications range of the access points 12a and 12b, where each access point 12a-12b has a defined range which is shown with reference to solid line 32.

As shown in operation 404, the apparatus 20 embodied, for example, by a mobile terminal 10, may include means, such as the processing circuitry 22, the processor 24, the communications interface 26 or the like, for receiving an ITS paging message from the first access point. As is shown in operation 406, the apparatus 20 embodied, for example, by a mobile terminal 10, may include means, such as the processing circuitry 22, the processor 24, or the like, to cause a reselection of the first RSU while in the communication range of a first access point in an ITS target area and in response to the received ITS paging message. As shown in operation 408, the apparatus 20 embodied, for example, by a mobile terminal 10, may include means, such as the processing circuitry 22, the processor 24, or the like, for causing a user data exchange to be initiated with the first RSU while in a connected state. An ITS paging message and resulting user data exchange is shown for example with reference to FIG. 7.

In an instance in which the mobile terminal, such as mobile terminal 10 has moved within an ITS target area, reselection to another RSU may be performed. As is shown in operation 410, the apparatus 20 embodied, for example, by a mobile terminal 10, may include means, such as the processing circuitry 22, the processor 24, or the like, for causing reselection to a second RSU while in the communication range of the first access point in an ITS target area while in a ready state in an instance in which a distributed triggering via an ITS paging message is received, wherein the second RSU is in data communication with the first access point. As described herein, the mobile terminal may perform reselection to another RSU within an ITS target area without the need to signal to the network.

As is shown in operation 412, the apparatus 20 embodied, for example, by a mobile terminal 10, may include means, such as the processing circuitry 22, the processor 24, the communications interface 26 or the like, for causing reselection to a third RSU in the communication range of a second access point in the ITS target area, wherein the third RSU is in data communication with a second access point in the ITS target area. In an instance that a mobile terminal, such as mobile terminal 10, moves to the communication range of a second access point B, as is shown in operation 414, the apparatus 20 embodied, for example, by a mobile terminal 10, may include means, such as the processing circuitry 22, the processor 24, or the like, receives an ITS paging message, wherein the ITS paging message comprises configuration information for the second access point and at least the third RSU.

FIG. 5 is a flow chart illustrating operations performed by an example access point in accordance with one embodiment of the present invention. As is shown in operation 502, the apparatus 20 embodied, for example, by an access point 12, may include means, such as the processing circuitry 22, the processor 24, or the like, for determining at least one next RSU in an ITS target area based on the determined location and at least the movement direction of the mobile terminal.

In an embodiment, an apparatus 20 embodied, for example, by an access point 12 may be configured to determine an RSU to prepare as the next target RSU for a mobile terminal. For example a next RSU may be chosen based on (i) the deterministic movement of the mobile terminal based on information gathered by the ITS system, (ii) mobile terminal positioning capability with location updated as needed such as by a global position system (e.g. as a mobile terminal enters a new ITS target area and/or after a predetermined time period);

and/or the target RSU is the next RSU on the road after the source RSU, in the direction of the mobile terminal movement.

Once a next RSU is determined and as is shown in operation 504, the apparatus 20 embodied, for example, by an access point 12, may include means, such as the processing circuitry 22, the processor 24, the communications interface 26 or the like, for causing configuration information to be transmitted to the mobile terminal, wherein the configuration information defines the ITS target area. For example, the configuration information may provide connection information for a plurality of RSUs that are connected to a single access point or a plurality of related access points. Also, as shown in operation 506, the apparatus 20 embodied, for example, by an access point 12, may include means, such as the processing circuitry 22, the processor 24, the communications interface 26 or the like, for causing an ITS paging message to be transmitted to the at least one next RSU. In an embodiment, by transmitting an ITS paging message to the RSU, the access point may, as is shown in operation 504, the apparatus 20 embodied, for example, by an access point 12, may Cause an ITS paging message to be transmitted to the mobile terminal from the determined next RSU. Example ITS paging messages are further described with reference to FIG. 7.

In an instance in which, a mobile terminal, such as mobile terminal 10 is traveling or is about to travel outside of the communication range of an access point in the ITS target area, as is shown in operation 510, the apparatus 20 embodied, for example, by an access point 12, may include means, such as the processing circuitry 22, the processor 24, the communications interface 26 or the like, for causing a determined location and at least the movement of direction of the mobile terminal to be transmitted to at least one next access point. Also, as is shown in operation 512, the apparatus 20 embodied, for example, by an access point 12, may include means, such as the processing circuitry 22, the processor 24, the communications interface 26 or the like, for receiving a RACH message and causing an RSU to be triggered in the communication range of a next access point in the ITS target area. Alternatively or additionally, an RSU may also include as is shown in operation 514, the apparatus 20 embodied, for example, by an access point 12, may include means, such as the processing circuitry 22, the processor 24, the communications interface 26 or the like, for receiving allocation update message and causing an RSU to be triggered in the communication range of a next access point in the ITS target area. Operations 512 and 514 preferably are configured to determine and trigger a next RSU on a mobile terminals path.

FIG. 6 is a flow chart illustrating operations performed by an example RSU in accordance with one embodiment of the present invention. As is shown in operation 602, the apparatus 20 embodied, for example, by an RSU 14, may include means, such as the processing circuitry 22, the processor 24, the communications interface 26 or the like, for receiving a location and at least a movement direction of an approaching mobile terminal. Also, as is shown in operation 604, the apparatus 20 embodied, for example, by an RSU 14, may include means, such as the processing circuitry 22, the processor 24, the communications interface 26 or the like, for receiving configuration information for the approaching mobile terminal. Additionally, as is shown in operation 606, the apparatus 20 embodied, for example, by an RSU 14, may include means, such as the processing circuitry 22, the processor 24, the communications interface 26 or the like, for receiving timing advance information for the approaching mobile terminal.

In response to the received location and movement direction, configuration information and timing advance information for the approaching mobile terminal, as is shown in operation 608, the apparatus 20 embodied, for example, by an RSU 14, may include means, such as the processing circuitry 22, the processor 24 or the like, for causing at least one receive window to be adjusted based on the received timing advance information. The RSU is further configured to, as is shown in operation 610, the apparatus 20 embodied, for example, by an RSU 14, may include means, such as the processing circuitry 22, the processor 24 or the like, for causing an ITS paging message to be transmitted to the mobile terminal. In response, as is shown in operation 612, the apparatus 20 embodied, for example, by an RSU 14, may include means, such as the processing circuitry 22, the processor 24, the communications interface 26 or the like, for receiving an indication that the approaching mobile terminal indicating that it has performed reselection.

FIG. 7 is a signaling flow diagram illustrating an example ITS paging procedure for a mobile terminal terminated service in accordance with one embodiment of the present invention. In an embodiment, a mobile terminal 10 may be configured to perform initial macro-cell access and establish an RRC connection with an access point 12. Once a connection is established, the data bearers may then be released, which then allows the mobile terminal 10 to enter a ready state (e.g. RRC_READY). Further, NAS-level security and determined mobile terminal 10 capabilities may be stored in an MME 18.

In an embodiment the RSU 14 receives an RRC configuration of a mobile terminal, such as mobile terminal 10, via an ITS paging message sent by the NAS-MME entity such as a system information block (SIB)-linked RadioResourceConfigCommon information element (IE), the message may contain defaultPagingCycle and prach-ConfigurationIndex, Paging Radio Network Temporary Identifier (P-RNTI), and/or a TA parameter. An RSU 14 may be configured to determine the access point-mobile terminal RRC Connection establishment and initial NAS-layer security activation via central triggering, which, for example, saves time in mobile terminal-RSU connection establishment. Example, central triggering may include, an MME 18, that is configured to trigger an RSU, such as RSU 14 of an approaching mobile terminal, such as mobile terminal 10, within an ITS target area via ITS paging messages. The MME 18 may then subsequently configure the RRC connection for the triggered RSU 14 and mobile terminal 10 including RRC message for connection establishment via signal radio bearer (SRB), dedicated RRC and NAS messages via SRB1 for security activation.

In an embodiment, the RSU 14 may be configured to cause an ITS paging message to be transmitted to the mobile terminal 10 to complete data radio bearer setup. One such method of transmission includes distributed triggering. Example distributed triggering includes, an RSU 14 that may relay NAS messages on SRB2 and RRC messages on SRB1 from an MME 18 to a mobile terminal 10 once security is activated. For example, distributed triggering allows for the fast set up and release of data radio bearer between RSU 14 and the mobile terminal 10, with the data radio bearer (DRB) setup occurring when the mobile terminal 10 enters the RSU 14 cell coverage and the DRB release occurring when the mobile terminal 10 leaves the RSU 14 coverage area.

In an instance in which a DRB is setup, an ITS end-to-end service may be provided by one-to-one mapping of the DRB to an evolved packet system (EPS) bearer in the internet protocol connectivity layer and an external bearer to a WAN (e.g. internet) linking mobile terminals to the ITS server/ machine type communications (MTC) server, and MTC users for machine to machine (M2M) applications.

As is shown in signal 702, the MME 18 send an ITS paging message to the access point 12. As is shown in signal 704, access point 12 is configured to forward the ITS paging message to RSU 14. In an embodiment, RSU 14 may be in a connected state, such as in RRC_CONNECTED state. In an embodiment, the ITS paging is sent to indicate to RSU 14 that a mobile terminal 10 is approaching the ITS target area. The ITS paging message may include but is not limited to mobile terminal paging parameters, a TA parameter of the mobile terminal 10, an indication of a type of ITS message to be transmitted to the mobile terminal 10, and/or pre-defined resource configuration for the mobile terminal 10 paging and/or an ITS paging message.

As is shown in signal 706, an RSU 14 may be configured to send ITS paging message to trigger a mobile terminal 10. In an embodiment, the mobile terminal 10 may be in a ready state (e.g. RRC_READY) and RSU 14 already may have the TA parameter of the mobile terminal 10 based on signal 702, thus a RACH preamble from the mobile terminal 10 to RSU 14 and a RACH response from RSU 14 to mobile terminal 10 may not be necessary.

In an embodiment, an ITS paging may be considered as an RRC message (e.g. as specified in TS 36.331, which is hereby incorporated by reference) with additional ITS paging fields. Alternatively or additionally enhanced universal mobile telecommunications system terrestrial radio accesss network (E-UTRAN) may address multiple mobile terminals 10 within a Paging message by including one PagingRecord for each mobile terminal 10. Hence, a PagingRecord may be used to deliver the individual information to each targeted RSU 14 or mobile terminal 10. An ITS paging message may also include ITS specific parameters. Alternatively or additionally, ITS-RSU-Paging and/or ITS-mobile terminal-Paging may be mutually exclusive.

An example ITS paging message may include:
pagingRecordList
    ue-Identity
    its-SpecificInformation (ITS-RSU-Paging or ITS-mobile terminal-Paging)

In an embodiment, the ITS-RSU-Paging information may point to OBUProximityIndication message giving the location indication of a mobile terminal and the its-OBU-Paging may point to ITSTargetAreaConfiguration message giving the pre-defined RSU resources. The RRC messages OBUProximityIndication and ITSTargetAreaConfiguration may be transmitted on SRB1. Paging messages may also include other optional fields in case they are relevant. For example, a non-exclusive listing of the fields of the RRC messages is shown below:

| OBUProximityIndication message |
|---|
| its-TargetArea-id |
| obu-Id |
| obu-TA |
| rsu-Config |

| OBUProximityIndication field descriptions |
|---|
| its-TargetAreaId |
| Indicates the ITS Target Area |
| obuId |
| Indicates the identity of mobile terminals entering the ITS target area. |

-continued

| obu-TA |
|---|
| Indicates the timing advance parameters of mobile terminals entering the ITS target area |
| rsu-Config |
| Indicates the pre-defined resources of RSUs within the ITS target Area (exact definition is beyond scope, but includes resource configuration for ITS paging to mobile terminals). |

| ITSTargetAreaConfiguration message |
|---|
| its-TargetAreaId |
| rsu-Id |
| rsu-Config |

| ITSTargetAreaConfiguration field descriptions |
|---|
| its-TargetAreaId |
| Indicates the ITS Target Area |
| rsu-Id |
| Indicates the identity of RSUs within the ITS target area. |
| obu-TA |
| Indicates the timing advance parameters of mobile terminals entering the ITS target area |
| rsu-Config |
| Indicates the pre-defined resources of RSUs within the ITS target Area (exact definition is beyond scope, but includes resource configuration for ITS paging to mobile terminals). |

In an embodiment, the access point cell specific random access parameters and static physical layer parameters may not be included in the RRC messages above since the RSU 14 is in a connected state, such as in a RRC_CONNECTED state, and the mobile terminal 10 may be in a ready state, such as a RRC_READY state, when receiving the ITS paging message.

In an embodiment, ITS paging messages may be sent as ordinary paging messages, as specified by E-UTRAN RRC specifications, and therefore SRB may not be necessary. Alternatively or additionally, ITS messages OBUProximityIndication and ITSTargetAreaConfiguration may be sent over SRB1 signalling. Alternatively or additionally, the mobile terminal 10 may also receive paging messages in addition to ITS paging messages.

As shown in signal 708, the RSU 14 may send RRCConnectionSetup to send SRB1 parameters. As shown in signal 710, mobile terminal 10 may send RRCConnectionSetupComplete via SRB1 to complete SRB1 establishment. As shown in signal 712, the RSU 14 may send RRCConnectionReconfiguration via SRB1 to establish SRB2 and DRB. As shown in signal 714, mobile terminal 10 may send RRCConnectionReconfigurationComplete via SRB1.

Alternatively or additionally, the signal 708 RRCConnectionSetup and signal 710 RRCConnectionSetupComplete may be omitted, and signal 712, the RRCConnectionReconfiguration message, may be sent after, or together with the ITS Paging message. In an embodiment, the mobile terminal 10 may have received RSU specific parameters (for all RSUs connected to particular access point, such as access point 12) when entering the access point 12 for the first time. Therefore, for example, it may enough to include only a pointer to these resources in an ITS Paging message.

As shown in signal 716, a user plane data transfer may occur. In an embodiment and at the end of user plane data transfer on DRB, the mobile terminal 10 may leave a connected state, such as an RRC_CONNECTED state, and may enter a ready state, such as a RRC_READY state. In an instance in which an access point 12 changes, and the mobile terminal 10 is in a ready state, such as an RRC_READY state, the mobile terminal 10 may enter an idle state, such as an RRC_IDLE state, and start an LTE session setup. Alternatively or additionally, in an instance in which there is not any overlapped coverage of RSUs 16 within an ITS target area, a timer may be activate, and at the timers expiration a mobile terminal 10 may be configured to enter an idle state, such as RRC_IDLE. The mobile terminal 10 may also initiate central triggering by an access point 12 to re-enter a ready state, such as an RRC_READY. Example state transitions to and from a ready state such as an RRC_READY state include, but are not limited to the following, the transition from RRC_CONNECTED->RRC-READY may occur at the conclusion of a user plane data transfer. The transition from RRC_READY->RRC_IDLE my occur in an instance in which a mobile terminal 10 moves out of coverage of existing access point, in some cases an access may determine that a mobile terminal 10 has entered idle, because the mobile terminal 10 is expected to move along a road under a next RSU, which is not in the range of the existing access point; In an instance in which a mobile terminal 10 is within and ITS target area without data transfer, for example after a timer expires and/or in an instance in which a mobile terminal. The transition from RRCREADY->RRC_CONNECTED may occur as a response to an ITS Paging message.

Advantageously, the apparatus 20, method and computer program product as described herein enables, for example, fast setup and release of RRC resources for mobile terminals in an ITS. Further, as described herein the signaling load is reduced as well as there is a reduction in RSU transmission interference, thus allowing for the implementation of the example cellular based ITS system as described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
  determining a location and at least a movement direction of a mobile terminal;
  determining at least one next road side unit "RSU" in an intelligent transportation system "ITS" target area based on the determined location and at least the movement direction of the mobile terminal;
  causing configuration information to be transmitted to the mobile terminal, wherein the configuration information defines the ITS target area;
  causing a first ITS paging message to be transmitted to the at least one next RSU; and
  causing a second ITS paging message to be transmitted to the mobile terminal from the determined next RSU based on the first ITS paging message.

2. The method according to claim 1, wherein
  the second ITS paging message includes at least one of paging parameters, timing advance parameters, ITS message type or predefined resource configuration.

3. A method comprising:
  determining a location and at least a movement direction of a mobile terminal;
  determining at least one next road side unit "RSU" in an intelligent transportation system "ITS" target area based on the determined location and at least the movement direction of the mobile terminal;
  causing configuration information to be transmitted to the mobile terminal, wherein the configuration information defines the ITS target area; and
  causing an ITS paging message to be transmitted to the mobile terminal from the determined next RSU, wherein
  at least one of the following is satisfied
    causing the ITS paging message to be transmitted to the mobile terminal from the determined next RSU further comprises causing the mobile terminal to transition from a ready state to a connected state, or
    the method further comprises causing the determined location and at least the movement of direction of the mobile terminal to be transmitted to at least one next access point.

4. The method according to claim 3, wherein
  causing the ITS paging message to be transmitted to the mobile terminal from the determined next RSU further comprises causing the mobile terminal to transition from the ready state to the connected state.

5. The method according to claim 3, further comprising:
  causing the determined location and at least the movement of direction of the mobile terminal to be transmitted to the at least one next access point.

6. The method according to claim 1, further comprising:
  receiving a random access channel (RACH) message; and
  causing an RSU to be triggered in the communications range of a next access point in the ITS target area.

7. The method according to claim 1, further comprising:
  receiving an allocation update message; and
  causing an RSU to be triggered in the communications range of a next access point in the ITS target area.

8. A non-transitory computer readable medium having program code stored thereon, the program code which when executed by an apparatus causes the apparatus at least to perform the method according to claim 1.

9. An apparatus comprising:
  circuitry configured to:
    determine a location and at least a movement direction of a mobile terminal;
    determine at least one next road side unit "RSU" in an intelligent transportation system "ITS" target area based on the determined location and at least the movement direction of the mobile terminal;
    cause configuration information to be transmitted to the mobile terminal, wherein the configuration information defines the ITS target area;
    causing a first ITS paging message to be transmitted to the at least one next RSU; and cause a second ITS paging message to be transmitted to the mobile terminal from the determined next RSU based on the first ITS paging message.

10. The apparatus according to claim 9, wherein the second ITS paging message includes at least one of paging parameters, timing advance parameters, ITS message type or predefined resource configuration.

11. An apparatus comprising:
circuitry configured to
    determine a location and at least a movement direction of a mobile terminal;
    determine at least one next road side unit "RSU" in an intelligent transportation system "ITS" target area based on the determined location and at least the movement direction of the mobile terminal;
    cause configuration information to be transmitted to the mobile terminal, wherein the configuration information defines the ITS target area; and
    cause an ITS paging message to be transmitted to the mobile terminal from the determined next RSU, wherein
at least one of the following is satisfied
    the ITS paging message is caused to be transmitted to the mobile terminal from the determined next RSU further by causing the mobile terminal to transition from a ready state to a connected state, or
    the circuitry is further configured to cause the determined location and at least the movement of direction of the mobile terminal to be transmitted to at least one next access point.

12. The apparatus according to claim 1, wherein the ITS paging message is caused to be transmitted to the mobile terminal from the determined next RSU further by causing the mobile terminal to transition from a ready state to a connected state.

13. The apparatus according to claim 11, wherein the circuitry is configured to cause the determined location and at least the movement of direction of the mobile terminal to be transmitted to the at least one next access point.

14. The apparatus according to claim 9, wherein the circuitry is configured to
    receive a random access channel (RACH) message; and
    cause an RSU to be triggered in the communications range of a next access point in the ITS target area.

15. The apparatus according to claim 9, wherein the circuitry is configured to:
    cause the apparatus to receive allocation update message; and
    cause an RSU to be triggered in the communications range of a next access point in the ITS target area.

16. The method according to claim 1, wherein causing the second ITS paging message to be transmitted to the mobile terminal from the determined next RSU further comprises causing the mobile terminal to transition from a ready state to a connected state.

17. The method according to claim 1, further comprising:
    causing the determined location and at least the movement of direction of the mobile terminal to be transmitted to at least one next access point.

18. The apparatus according to claim 9, wherein causing the second ITS paging message to be transmitted to the mobile terminal from the determined next RSU further comprises causing the mobile terminal to transition from a ready state to a connected state.

19. The apparatus according to claim 9, wherein the circuitry is further configured to cause the determined location and at least the movement of direction of the mobile terminal to be transmitted to at least one next access point.

* * * * *